(12) United States Patent
Park et al.

(10) Patent No.: US 9,611,908 B2
(45) Date of Patent: Apr. 4, 2017

(54) ELECTROMECHANICAL BRAKE DEVICE

(71) Applicant: MANDO CORPORATION, Pyeongtaek-si, Gyeonggi-do (KR)

(72) Inventors: Seung Young Park, Yongin-si (KR); Hyun Ku, Yongin-si (KR)

(73) Assignee: MANDO CORPORATION, Gyeonggi-Do (KR)

( * ) Notice: Subject to any disclaimer, the term of this patent is extended or adjusted under 35 U.S.C. 154(b) by 243 days.

(21) Appl. No.: 14/309,355

(22) Filed: Jun. 19, 2014

(65) Prior Publication Data

US 2015/0027820 A1    Jan. 29, 2015

(30) Foreign Application Priority Data

Jul. 26, 2013 (KR) .................. 10-2013-0088914

(51) Int. Cl.
*F16D 65/00* (2006.01)
*F16D 65/18* (2006.01)
(Continued)

(52) U.S. Cl.
CPC .......... *F16D 65/0068* (2013.01); *F16D 65/18* (2013.01); *F16D 2066/003* (2013.01);
(Continued)

(58) Field of Classification Search
CPC ....... F16F 65/0068; F16F 31/06; F16D 65/18; F16D 2066/003; F16D 2066/005;
(Continued)

(56) References Cited

U.S. PATENT DOCUMENTS 3,078,734 A * 2/1963 Wug ..................... B21D 43/09
188/196 M
4,014,411 A * 3/1977 Troester ................. F16D 65/18
188/196 BA
(Continued)

FOREIGN PATENT DOCUMENTS

DE 29 46 852 A1 6/1981
DE 198 04 454 A1 5/1999
(Continued)

OTHER PUBLICATIONS

German Office Action issued in corresponding German Patent Application No. 102014009131.7, mailed on Dec. 2, 2016.

*Primary Examiner* — Xuan Lan Nguyen
(74) *Attorney, Agent, or Firm* — McDermott Will & Emery LLP

(57) ABSTRACT

The present invention is directed to an electromechanical brake device for securing the structural reliability and improving the stability even when overloading. The electromechanical brake device configured to brake by pressing a disk-shaped disc, which is rotated with motor vehicle wheels, with a pair of friction pads, and including a piston unit configured to move the friction pads in a direction of the disc, including: an internal shaft connected to an external motor so as to rotate when the motor is driven; an external shaft, in which an end of the internal shaft is inserted, configured to rotate together when the internal shaft is rotated, and to which the piston unit is connected so as to move in the disc direction; and a load control unit provided between the internal shaft and the external shaft, so that the external shaft is rotated together when the internal shaft is rotated, and the internal shaft and the external shaft are
(Continued)

rotated at different speeds when a load of a predetermined value or more is applied between the internal shaft and the external shaft.

4 Claims, 4 Drawing Sheets

(51) Int. Cl.
    *F16D 66/00*       (2006.01)
    *F16D 121/24*     (2012.01)
    *F16D 125/40*     (2012.01)
    *F16D 125/46*     (2012.01)
    *F16D 127/00*     (2012.01)

(52) U.S. Cl.
    CPC .... *F16D 2066/005* (2013.01); *F16D 2121/24* (2013.01); *F16D 2125/40* (2013.01); *F16D 2125/46* (2013.01); *F16D 2127/00* (2013.01)

(58) Field of Classification Search
    CPC ............. F16D 2121/24; F16D 2125/40; F16D 2125/46; F16D 2127/00
    USPC ........................................................ 188/72.8
    See application file for complete search history.

(56) References Cited

U.S. PATENT DOCUMENTS

| | | | | |
|---|---|---|---|---|
| 4,333,555 A * | 6/1982 | Gogins | ................... | F16H 29/04 192/41 R |
| 4,350,228 A * | 9/1982 | Luepertz | ................. | F16D 65/18 188/196 D |
| 4,770,054 A * | 9/1988 | Ha | ......................... | F16D 41/066 192/223.2 |
| 4,901,836 A * | 2/1990 | Stenmark | .............. | F16D 43/208 192/56.5 |
| 5,120,913 A * | 6/1992 | Leach | .................. | H02B 11/127 200/50.26 |
| 5,722,516 A * | 3/1998 | Forni | .................... | F16D 65/183 188/196 BA |
| 6,315,092 B1 * | 11/2001 | Schwarz | ................. | B60T 13/741 188/162 |
| 6,752,249 B1 * | 6/2004 | Jungbecker | ............. | F16D 65/18 188/162 |

FOREIGN PATENT DOCUMENTS

| | | |
|---|---|---|
| DE | 10 2006 000 746 A1 | 7/2007 |
| DE | 10 2007 015 809 A1 | 10/2008 |
| DE | 10 2011 005 517 A1 | 9/2012 |

* cited by examiner

ELECTROMECHANICAL BRAKE DEVICE

CROSS-REFERENCE TO RELATED APPLICATIONS

The present application claims the benefit of priority to Korean Patent Application No. 10-2013-0088914, filed on Jul. 26, 2013, the entire contents of which is incorporated herein for all purposes by this reference.

BACKGROUND

1. Field of the Invention

The present invention relates to a disc brake, and more particularly, to an electromechanical brake device capable of solving a structural problem that can occur at a piston unit or a brake device itself when a motor malfunctions.

2. Discussion of Related Art

In general, as brake devices are mounted on motor vehicle wheels, the braking force is obtained by operating a brake pedal while driving, and the braking force is generated by operating a parking brake lever so as to maintain a stop state while parking.

In the conventional brake device, as friction pads are provided on both sides of a disc, and a piston, which is driven by a hydraulic or a motor, strongly presses the friction pads to the disc, the motor vehicle is braked.

As an example, the conventional electromechanical brake device includes the disc and the friction pads described above, a motor, that is, a piston drive unit for pressing the friction pads to the disc, a decelerator connected to the motor, and a linear motion converting mechanism.

While the electromechanical brake device has a simple structure compared to that of the hydraulic brake device, it causes severe problems that the piston unit which is a main component and the linear motion converting mechanism configured to move the piston unit are overloaded when a rotational direction of the motor and the motor are malfunctioned.

SUMMARY OF THE INVENTION

The present invention is directed to an electromechanical brake device capable of solving a structural problem which can occur at a piston unit or a brake device itself when a motor malfunctions.

According to an aspect of the present invention, there is provided an electromechanical brake device configured to brake by pressing a disk-shaped disc, which is rotated with motor vehicle wheels, with a pair of friction pads, and including a piston unit configured to move the friction pads in a direction of the disc, including: an internal shaft connected to an external motor so as to rotate when the motor is driven; an external shaft, in which an end of the internal shaft is inserted, configured to rotate together when the internal shaft is rotated, and to which the piston unit is connected so as to move in the disc direction; and a load control unit provided between the internal shaft and the external shaft, so that the external shaft is rotated together when the internal shaft is rotated, and the internal shaft and the external shaft are rotated at different speeds when a load of a predetermined value or more is applied between the internal shaft and the external shaft.

The load control unit may include a first friction member provided in the external shaft while being in contact with an outer circumferential surface of the internal shaft, a second friction member provided in the internal shaft to be in contact with both sides of the first friction member so as to rotate together with the external shaft when the internal shaft is rotated, and an elastic member provided in the external shaft, so that the first friction member contacts the outer circumferential surface of the internal shaft in a pressurized state, and the internal shaft and the external shaft are rotated at different speeds by moving the first friction member beyond the second friction member when a load of a predetermined value or more is applied between the internal shaft and the external shaft.

The first friction member moves beyond the second friction member when the internal shaft is rotated in a circumferential direction of one side, and a load of predetermined value or more is applied to the internal shaft, wherein the first friction member and the second friction member may be formed so that the internal shaft is rotated with the external shaft regardless of a degree of the load when the internal shaft is rotated in a circumferential direction of another side.

BRIEF DESCRIPTION OF THE DRAWINGS

The above and other objects, features, and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
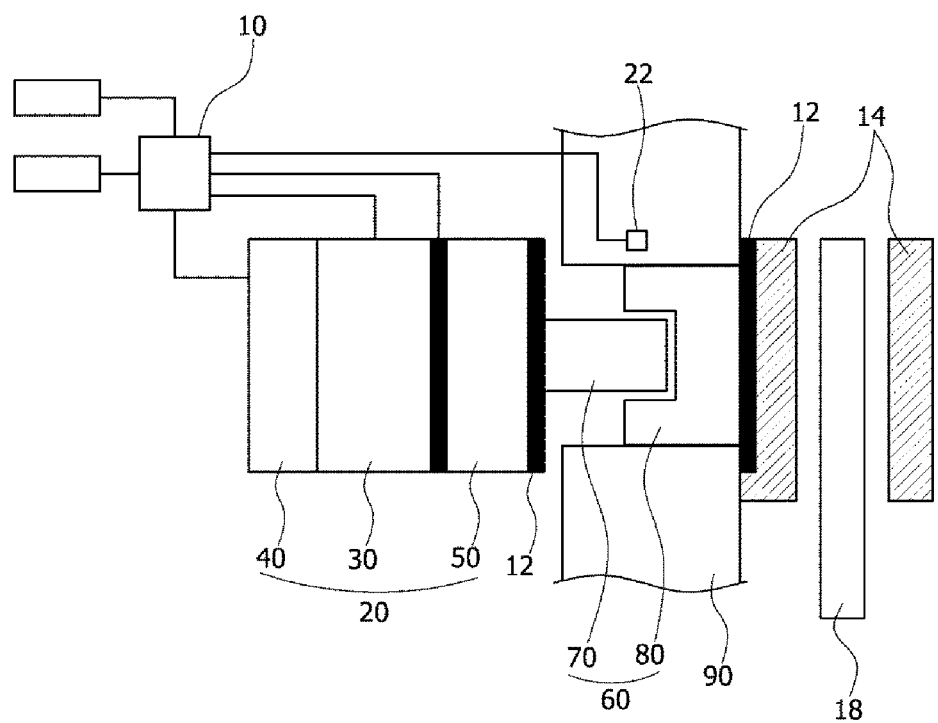
FIG. 1 is a schematic diagram showing an electromechanical brake device in accordance with the present invention.

Hereinafter, exemplary embodiments of the invention will be described in detail with reference to the accompanying drawings. In descriptions of the exemplary embodiments of the invention, like reference numerals denote like elements, and thus the additional description thereof will not be repeated.

FIG. 1 is a schematic diagram showing an electromechanical brake device in accordance with the present invention. The electromechanical brake device includes an engine control unit (ECU) 10 configured to receive various vehicle sensor signals with a control button configured to send a parking brake signal, an actuator module 20 driven through the ECU 10 and configured to generate parking braking force, and a pressurized module 60 configured to push a friction pad 14 through rotational force of the actuator module 20 in a wheel disc 18 direction and apply restraint force.

In general, the ECU 10 includes a conventional control logic for parking braking, and a control logic configured to adjust the parking braking force in accordance with wear of the friction pad 14 and inform an exchange time of the friction pad 14 is further added.

The actuator module 20 includes a motor 30 seated in a housing 90 and driven through the ECU 10, and a decelerator 50 configured to decelerate the number of rotations of the motor 30 and switch to a large output torque.

Here, the decelerator 50 includes various gear arrangements and types conventionally applied to the electromechanical brake device, and a final output torque is determined according to the design specifications.

Further, the pressurized module 60 is mounted in the housing 90, and includes a rotating shaft 70 rotated through the decelerator 50 configured to generate the output torque, and a piston unit 80 screwed to the rotating shaft 70 and configured to push out or retreat the friction pad 14 along a rotational direction of the rotating shaft 70.

Here, the rotating shaft 70 and the piston unit 80 are mounted in an axial direction of the rotating shaft 70, and are arranged so that the piston unit 80 is linearly moved by rotating the rotating shaft 70. To this end, a screw thread is formed on an outer peripheral surface of the rotating shaft 70, and a screw thread corresponding to the screw thread of the rotating shaft 70 is formed on the piston unit 80. The piston unit 80 is formed to move according to the rotating shaft 70 rotated in a state in which a location thereof is fixed.

The electromechanical brake device of the present invention further includes a sensor module configured to sense the number of rotations of the motor 30, press force of the friction pad 14 configured to restraint the disc 18, and worn condition of the friction pad 14, as the ECU 10.

The sensor module includes a rotation angle sensor 40 provided in the motor 30 so as to sense the number of rotations of the motor 30, a load sensor 12 mounted so as to measure a degree of the pressure of the friction pad 14, and a limit sensor 22 configured to sense a degree of the wear of the friction pad 14.

Here, the load sensor 12 may be mounted on a plurality of locations, and as an example, the load sensor 12 is accordingly mounted on a location of the motor 30 or the decelerator 50, or a location of the friction pad 14.

Figure 2:
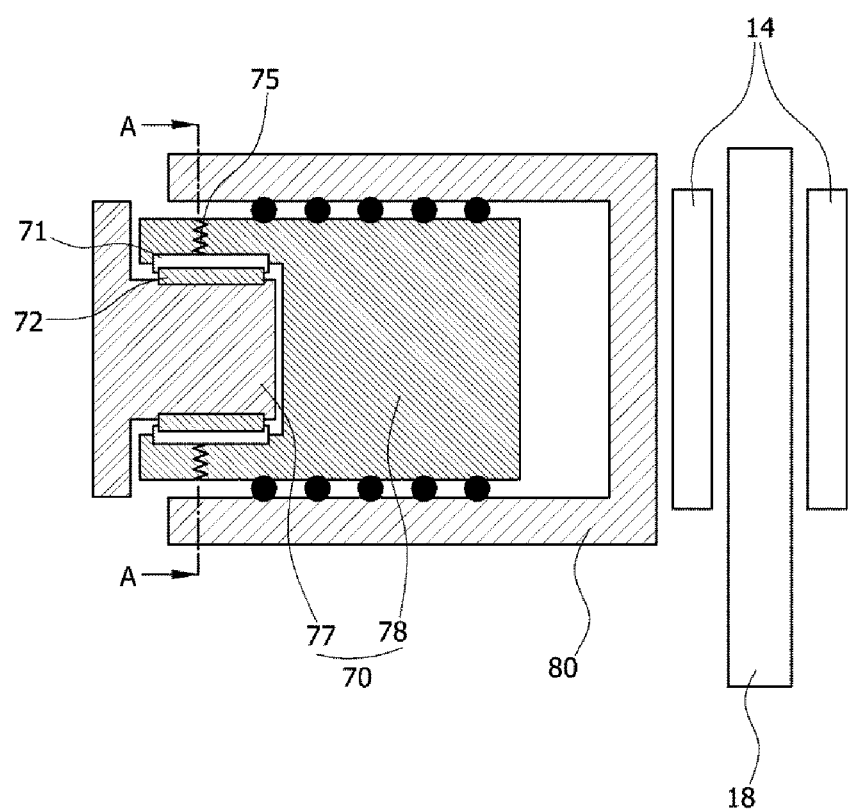
FIG. 2 is a cross-sectional side view showing a main part of the electromechanical brake device in accordance with the present invention.

FIG. 2 is a cross-sectional side view showing a main part of the electromechanical brake device in accordance with the present invention.

As shown in FIG. 2, the electromechanical brake device in accordance with the present invention is provided in a shaft unit 70, and includes a load control unit so as to adjust a degree of the load when the shaft unit 70 is forwardly/reversely rotated.

Here, the shaft unit 70 includes an internal shaft 77 and an external shaft 78, which have the same rotational axis, and are mounted so as to rotate at different speeds.

As shown in FIG. 2, the internal shaft 77 and the external shaft 78 have a predetermined distance, and an end of the internal shaft 77 is inserted into the external shaft 78.

Further, the load control unit are mounted between the internal shaft 77 and the external shaft 78, and rotated together. The internal/external shaft 77 and 78 are rotated at different rotation speeds when a load of a predetermined value or more is applied.

Hereinafter, a connection structure of the internal shaft 77 and the external shaft 78 will be described in detail.

Figure 3:
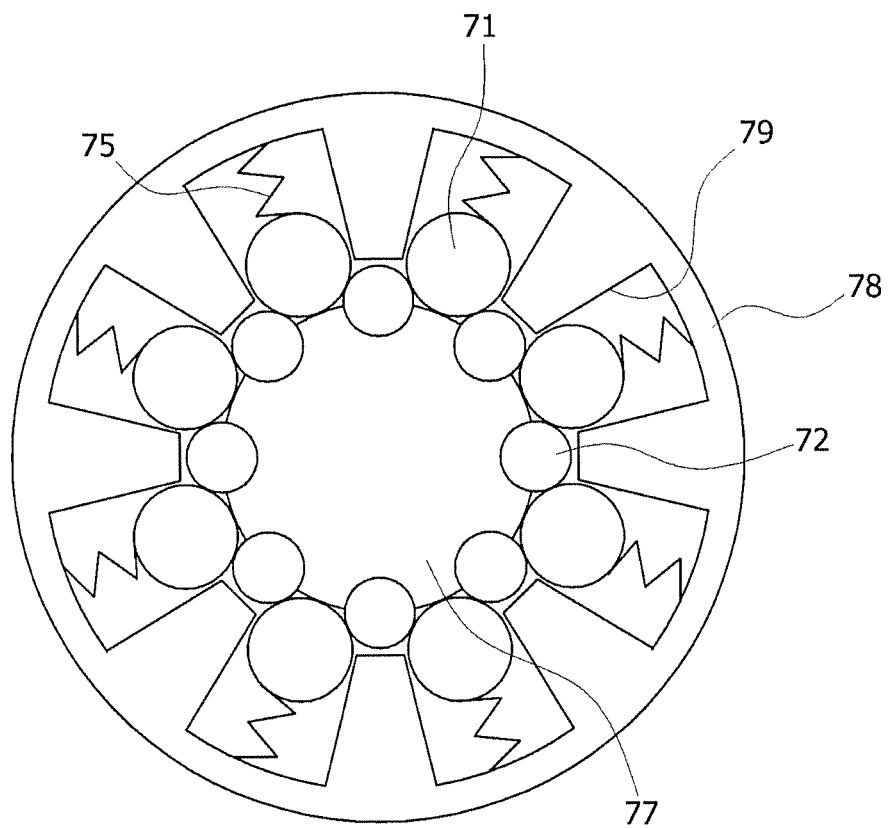
FIG. 3 is a cross-sectional view showing a structure in accordance with a first embodiment of the internal shaft and the external shaft in a cross-section taken along line A-A of FIG. 2.

FIG. 3 is a cross-sectional view showing a structure in accordance with a first embodiment of the internal shaft and the external shaft in a cross-section taken along line A-A of FIG. 2.

As shown in FIG. 3, the load control unit includes a first friction member 71 provided in the external shaft 78 so as to contact the internal shaft 77, and an elastic member 75 configured to adjust a degree of the pressure when first friction member 71 contacts the internal shaft 77. The elastic member 75 may have a coil spring.

The first friction member 71 and the elastic member 75 are provided on each predetermined spaced location along a circumferential direction of an inner diameter of the external shaft 78.

Here, the first friction member 71 is mounted to move to an inside of the external shaft 78 by a predetermined distance as the elastic member 75 is compressed. To this end, a mounting groove 79, in which the first friction member 71 and the elastic member 75 are mounted, is provided in the external shaft 78.

Further, a second friction member 72 in contact with the first friction member 71 is provided in the internal shaft 77. As shown in FIG. 3, the second friction member 72 is provided, so that the second friction member 72 and the first friction member 71 are disposed in a zigzag shape with each other along a circumferential direction of the internal shaft 77, and contacts two adjacent first friction members 71.

As configured above, when the internal shaft 77 is rotated, the external shaft 78 is also rotated together. However, in a case that the internal shaft 77 and the external shaft 78 are rotated, when a momentary overload occurs between the shafts 77 and 78, it is possible to move the first friction member 71 inside the mounting groove 79, and to operate beyond the second friction member 72.

Thus, a situation, in that the internal shaft 77 and the external shaft 78 are running idle with each other, is prevented. That is, as the shafts 77 and 78 are rotated at different speeds, the rotation of the external shaft 78 is prevented. Therefore, a problem, in that stress applied to the piston unit 80 is severe, is also solved.

Figure 4:
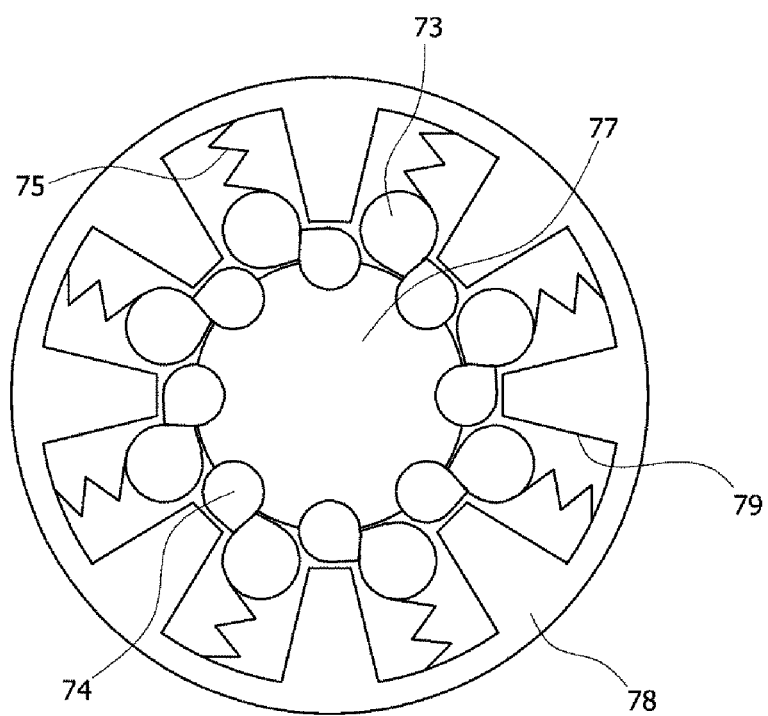
FIG. 4 is a cross-sectional view showing a structure in accordance with a second embodiment of the internal shaft and the external shaft in a cross-section taken along line A-A of FIG. 2.

FIG. 4 is a cross-sectional view showing a structure in accordance with a second embodiment of the internal shaft and the external shaft in a cross-section taken along line A-A of FIG. 2.

As shown in FIG. 4, a first friction member 73 and a second friction member 74 are formed so that the internal shaft 77 is always rotated with the external shaft 78 when the internal shaft 77 is rotated in a circumferential direction of another side. When the internal shaft 77 is rotated in a circumferential direction of one side, and a load of predetermined value or more is applied, a kind of one way clutch type, in that first friction member 73 is rotated beyond the second friction member 74, may be formed.

That is, as the friction members 73 and 74 are partially formed as a cam profile, and at the same time are engaged with each other, whether the external shaft 78 is rotated or not, and the rotation speed thereof may be adjusted according to a rotational direction of the internal shaft 77.

In general, structural problems occur in the electromechanical brake device when the motor is reversely rotated rather than forwardly rotated. However, when a configuration of the shaft unit in accordance with the second embodiment of the present invention is applied, these problems are more efficiently solved.

According to the present invention as described above, when the electromechanical brake device is in a fail mode, or an error or excessive reverse rotation of the sensor is caused, the power is not delivered to the piston unit as the internal shaft is separated from the external shaft. Therefore, it is possible to stably drive the electromechanical brake device, and the durability of the electromechanical brake device itself can be improved.

Effects of the electromechanical brake device of the present invention configured as described above will be described.

According to the present invention, in a case that a certain load or more is applied in a reverse direction in order to prevent mechanical damage caused when the electromechanical brake device is in a fail mode, or an error or excessive reverse rotation of the sensor is caused, the power is not delivered to the piston unit as the internal shaft is separated from the external shaft. Therefore, it is possible to stably drive the electromechanical brake device, and the durability of the electromechanical brake device itself can be improved.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. An electromechanical disc brake device including a piston unit which is configured to move friction pads in a direction of a disc, the electromechanical disc brake comprising:
    an external shaft configured to rotate within the piston unit and to move the piston unit in the direction of the disc or in the opposite direction of the disc, the external shaft having a plurality of first friction members along an inner surface of the external shaft; and
    an internal shaft connected to a motor to rotate when the motor is driven and located within the external shaft, the internal shaft having a plurality of second friction members arranged between the first friction members along an outer circumferential surface of the internal shaft and contacting two adjacent first friction members,
    wherein each of the first friction members is disposed on an end of an elastic member, which is located in a mounting groove formed along the inner surface of the external shaft, and is in contact with the outer circumferential surface of the internal shaft.

2. The device of claim 1, wherein:
    each of the second friction members is engaged with the two adjacent first friction members and applies pressure on the two adjacent first friction members when a load less than a predetermined value is applied to the internal shaft.

3. The device of claim 2, wherein:
    each of the second friction members operates by contacting the two adjacent first friction members when a load of the predetermined value or more is applied to the internal shaft.

4. The device of claim 1, wherein:
    while the internal shaft rotates in one direction, each of the second friction members is engaged with the two adjacent first friction members and applies pressure on the two adjacent first friction members when a load less than a predetermined value is applied to the internal shaft; and
    while the internal shaft rotates in the other direction, each of the second friction members is engaged with the two adjacent first friction members and applies pressure on the two adjacent first friction members.

* * * * *